July 17, 1956  H. R. PINKERTON  2,754,528
PIPE HOLDING VISE WITH INCREASING CLAMPING
ACTION UNDER TORSIONAL INFLUENCE
Filed Nov. 17, 1951  2 Sheets-Sheet 1
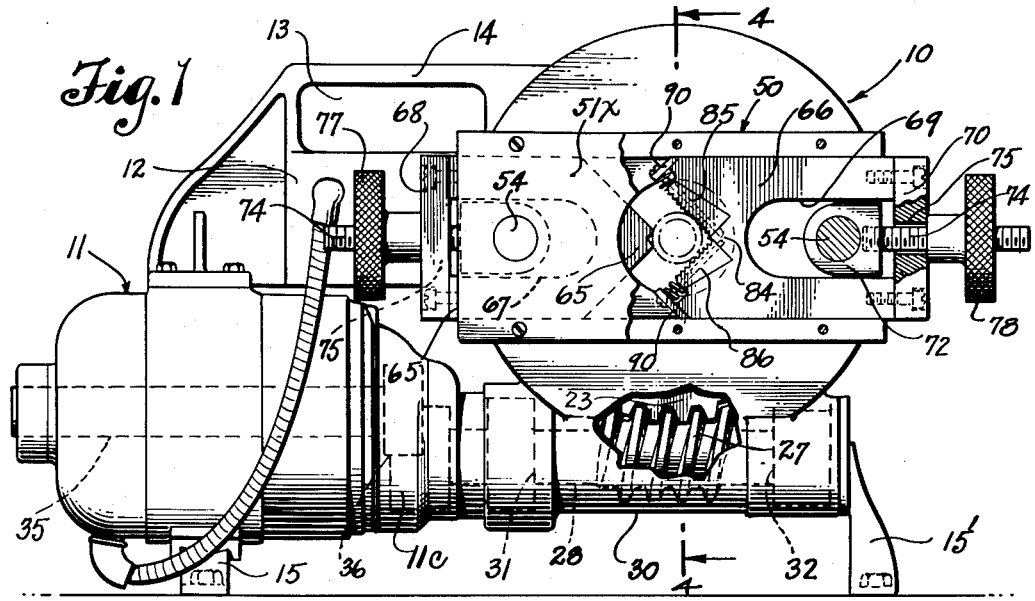
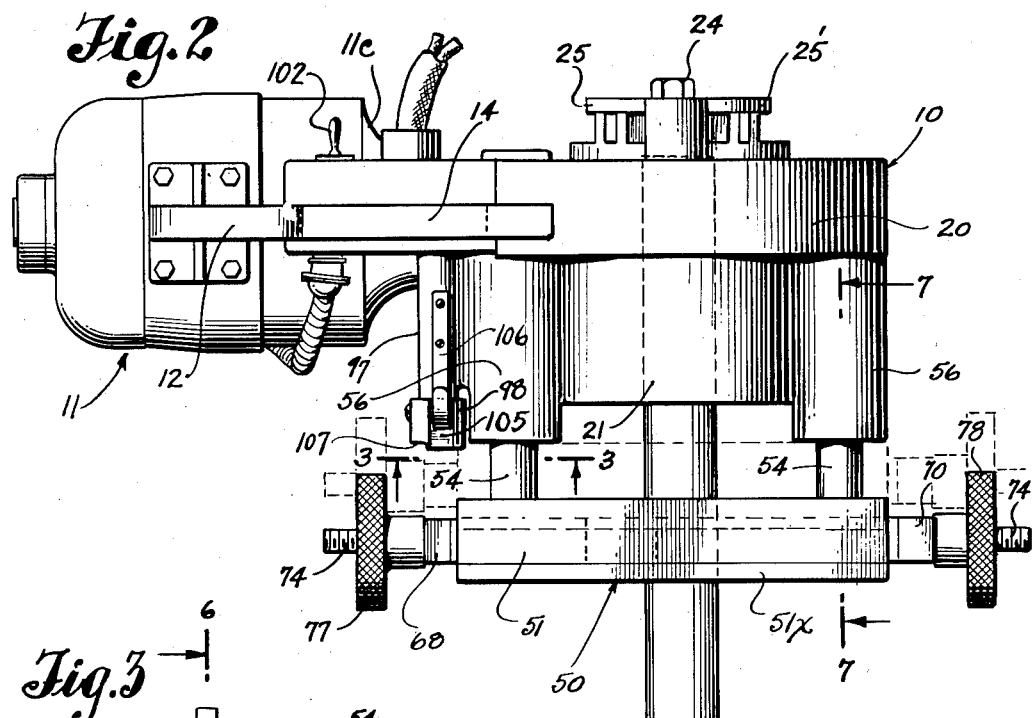
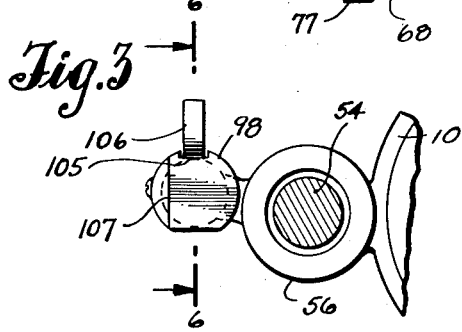
INVENTOR.
HAROLD R. PINKERTON
BY
Cook + Robinson
ATTORNEYS July 17, 1956
H. R. PINKERTON
2,754,528
PIPE HOLDING VISE WITH INCREASING CLAMPING
ACTION UNDER TORSIONAL INFLUENCE
Filed Nov. 17, 1951
2 Sheets-Sheet 2
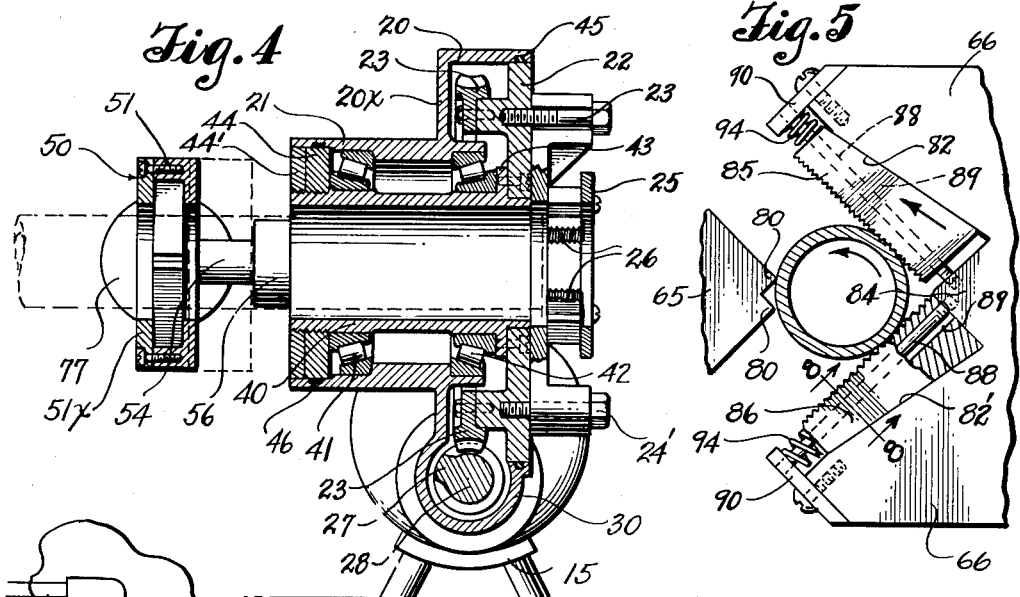
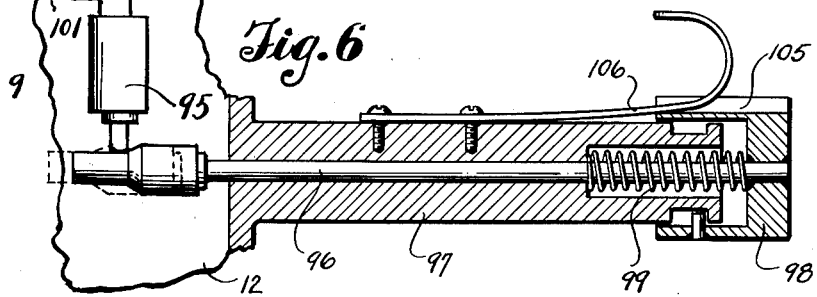
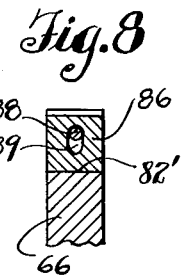
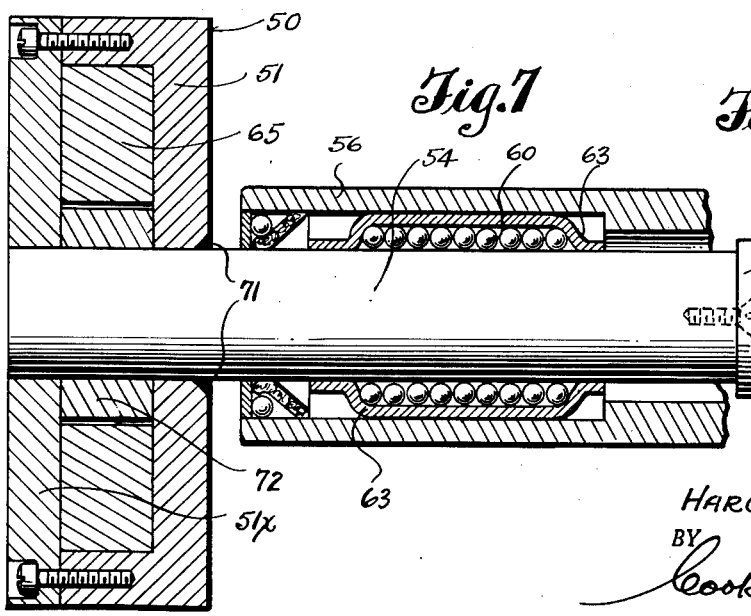
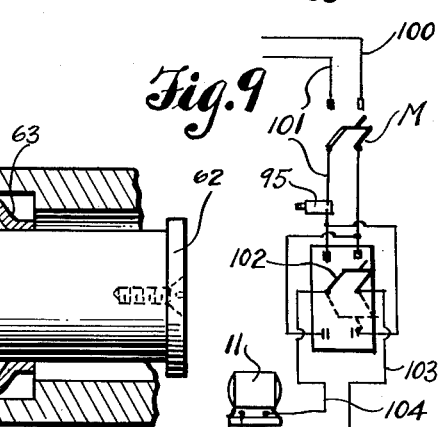
INVENTOR.
HAROLD R. PINKERTON
BY
Cook & Robinson
ATTORNEYS 2,754,528
Patented July 17, 1956

2,754,528

PIPE HOLDING VISE WITH INCREASING CLAMPING ACTION UNDER TORSIONAL INFLUENCE

Harold R. Pinkerton, Seattle, Wash., assignor of one-fourth to Allen T. Ridgeway, Yakima, one-fourth to Edward H. O'Boyle, Walla Walla, and one-fourth to John W. Ballack, Seattle, Wash.

Application November 17, 1951, Serial No. 256,851

2 Claims. (Cl. 10—107)

This invention relates to pipe threaders and it has reference more particularly to motor driven threaders wherein the thread forming means is combined with a novel form of pipe holding vise.

It is the principal object of this invention to provide a unitary combination of parts of the above character including a main frame structure in which a holder for selected pipe threading dies is rotatably secured, and is adapted to be rotated for the thread cutting operation by an electric motor, and wherein the pipe holding vise is supported by the main frame structure and is movable to permit the automatic advancement of the held pipe to the dies as the threads are formed thereon.

It is also an object of the invention to provide a novel vise construction, characterized by the provision of novel co-acting jaws, one of which is equipped with toothed or serrated pipe gripping blocks, so designed and mounted as to automatically increase their gripping effect on the pipe under its tendency to turn with the threaded dies.

Another object of the invention is to so mount the pipe holding vise that, while its jaws are clamped to the pipe, it will be permitted to move toward the dies in accordance with the formation of the threads along th pipe.

Another object of the invention resides in utilizing the housing of the electric motor as a part of the main frame structure, and to provide a limit switch in connection with the motor circuit, that will be actuated to an open position to stop the thread cutting operation incident to inward advancement of the vise to a predetermined position.

Further objects of the invention reside in the specific details of construction of parts of the vise and in their mode of use in the present combination.

In accomplishing the above mentioned and other objects of the invention, I have provided the improved details of construction, the preferred forms of which are illustrated in accompanying drawings, wherein—

Fig. 1 is an elevation of the present thread cutting device as seen from the vise mounting end thereof.

Fig. 2 is a top, or plan view of the threader, showing the application of a piece of pipe thereto for a thread cutting operation.

Fig. 3 is a somewhat enlarged cross-sectional detail, taken on the line 3—3 in Fig. 2, showing the limit switch actuator.

Fig. 4 is a vertical cross-section through the device, taken on line 4—4 in Fig. 1.

Fig. 5 is an enlarged view of the adjacent end portions of the jaw members of the vise, particularly illustrating the pipe gripping blocks movably applied to one of these jaw members and engaged with a pipe.

Fig. 6 is an enlarged sectional view, showing the limit switch and its actuator.

Fig. 7 is an enlarged, cross-sectional detail, taken on the line 7—7 in Fig. 2, showing the means for and manner of mounting a vise supporting rod.

Fig. 8 is a cross-section on line 8—8 in Fig. 5.

Fig. 9 is a wiring diagram for the motor and control switches.

Referring more in detail to the drawings—

In its present preferred form of construction, the thread cutter is made as a hand portable bench unit that need not necessarily be fixed to the bench for its intended use. As shown best in Fig. 1, it comprises a rigid, unitary frame structure that is formed by the rigid joining together of a gear enclosing housing 10, a motor housing 11 and a bracing and carrying bracket 12; the latter being formed with an elongated hand hole 13 near its top edge, setting off a horizontal handle portion 14 which may be grasped for the easy carrying of the device substantially in a balanced condition.

It is also to be observed by reference to Fig. 1, that leg forming brackets 15—15' are applied to the motor housing 11 and to the gear case 10, respectively, for the proper upright support of the threader in use. These legs might be of various design, and may be extended to any length as desired or required, to support the device on a floor, bench or other form of support.

In its present form, the threader comprises three principal parts, one of which is the frame structure which is comprised by the rigidly joined housing 11 of the driving motor, the gear housing 10 and the bracket 12; another of which is the die holding parts and their turning mechanism, and the third being the pipe holding vise. It will be observed best by reference to Figs. 2 and 4, that the gear housing 10 comprises a relatively short cylindrical casing 20, closed at one end by an integrally cast wall 20x from which end wall a cylindrical casing 21 of lesser diameter but substantially longer than casing 20, extends; the parts 20 and 21 being coaxially related. At its other end, the cylindrical casing 20 has a closure member 22 of disk form rotatably fitted therein. Fixed to the inner face of this closure member, or disk 22, coaxially thereof and also coaxial of the casings 20 and 21 as seen in Fig. 4, is a worm gear 23 by means of which the disk 22 is rotatably driven for a thread cutting operation, as presently will be explained.

Fixed to the outer face of the plate 22 by bolts 24—24' are complemental die holders 25—25' in which selected thread cutting dies 26 are functionally held for the cutting of threads on a pipe that is advanced thereto. To rotate the plate 22 and dies 26 as mounted thereon for a thread cutting operation, I provide a worm 27, on a shaft 28, in operative mesh with the worm gear 23. The worm shaft 28 is contained in a tubular housing 30 that is integrally cast with the casing 20 across the lower portion thereof as shown in Figs. 1 and 4.

At its ends, the shaft 28 is revolubly supported in bearings fitted in housing 30 as indicated at 31 and 32 in Fig. 1, and at one end it has a driving connection with the drive shaft 35 of the electric motor contained in the housing 11. The driving connection between the motor shaft 35 and worm shaft 28 can be of any suitable kind and may include speed reducing gearing if this is found desirable. In the present instance, the means providing the driving connection is not shown in detail but is merely indicated at 36 and is contained in a casing designated in Fig. 2 by reference numeral 11c. It is to be understood that when the electric motor 11 is energized, it drives the worm shaft 28 and the worm drives the ring gear 23, and rotates the plate 22 and pipe threading dies 26.

Revolubly mounted in gear housing 10, coaxial of the parts 20 and 21 thereof, is a cylindrical guide sleeve 40. This is rotatably supported adjacent its oppposite ends in anti-friction bearings, 41—42, here shown to be of the tapered roller type, and functionally mounted in the end portions of the cylindrical casing 21. At one end, the sleeve 40 is fitted in an opening provided therefor centrally in the wall disk 22, and it is provided adjacent that end with an encircling flange 43 to which the disk 22 is bolted. At its other end, the sleeve has disks 44—44' threaded thereonto, and these disks are rotatably fitted in the outer end of the cylindrical casing 21, as best shown in Fig. 4. Gaskets 45—46 seal the joints between the disk 22 and its casing, and between disk 44 and its casing, respectively, to retain a lubricant in the housing.

In a thread cutting operation, it is necessary to hold the pipe that is to be threaded against rotation. For this purpose I provide a vise which is attached to and supported by the frame structure of the machine. This vise is designated in its entirety in Figs. 1 and 2 by numeral 50 and it comprises an elongated, horizontally disposed housing 51 supported across one end of the frame structure as shown in Fig. 1 by two parallel and horizontally disposed guide rods 54—54, fixed rigidly thereto and extended laterally therefrom; the ends of these rods being slidably contained in tubular supporting bearings 56—56 that are cast integrally with the housing 10 as shown in Fig. 2. Furthermore, it is shown in Fig. 7 that the rods 54—54 are slidably contained in anti-friction ball bearings 60 contained in the bearings 56, and are limited in their outward travel by means of disks 62 fixed to their inner ends to engage against cages 63 in which the ball bearings 60 are contained. The slidable mounting of the rods 54—54 in their supporting bearings permits the vise to be shifted inwardly or outwardly between the full line position and dotted line position in which it is shown in Fig. 4.

Slidably contained in the frame structure of the vise 50 for guided, horizontal movement from and toward each other, are the vise jaws 65 and 66. Jaw 65, as seen in Fig. 1 is formed along its outer end portion with a horizontal slot 67 with a bar 68 disposed and secured thereacross at its outer end. Likewise, the jaw 66 is formed along its outer end portion with a horizontal slot 69, closed at its outer end by a bar 70 secured vertically across that end of the jaw plate. The outer end portions of the two rods 54—54 which support the vise frame, extend through and are welded to the back wall plate of the housing 51, as at 71 in Fig. 7, then continue through slots of the vise jaws, and through holes in the removable front cover plate 51x of the housing. Secured on the guide rods, within the slotted portions of the jaws, are blocks 72—72 and threaded into these blocks are the inner ends of shafts 74—74 that extend outwardly therefrom, through holes 75 in the bars 68 and 70, respectively. Hand nuts 77 and 78 are threaded onto the outer end portions of these shafts and are adapted to be adjusted inwardly therealong to engage with and shift the jaws inwardly to pipe engaging position, for example, as indicated in Fig. 1.

The jaw 65 has its inner end portion tapered toward a point and this point terminates in two closely related, horizontal teeth 80—80 formed thereacross as best shown in Fig. 5. The inner end portion of the jaw member 66 is formed with a V-shaped recess that opens directly toward the opposite jaw and this recess is formed at its vertex with a short V-shaped projection 84. Pipe gripping blocks 85 and 86 are slidably disposed against the inwardly sloping side wall surfaces 82—82' of the jaw recess, with their inner ends normally engaged flatly against the side surfaces of the projection 84. The blocks 85—86 are held in place by rods 88 extended lengthwise therethrough in oversized passages 89; the rods being anchored at their inner ends in the projecting part 84 and at their outer ends are secured in plates 90—90 that are bolted to the jaw at the outer end of the recess as shown in Fig. 5. Coiled springs 94 are applied about the anchor rods between the plates 90—90 and the adjacent ends of blocks 85—86 to urge the latter inwardly. The gripping surfaces of the blocks 85 and 86 are serrated or knurled to insure a good gripping effect. These surfaces lie in planes at about a 90° angle, to engage the pipe at one side above and below the horizontal plane of its axial line, while it is engaged at the other side against the end of jaw 65, as in Fig. 5. It will be observed also that the inwardly sloping side surfaces 82—82' of the V-shaped recess against which the blocks 85 and 86 are slidably engaged, converge at a lesser angle than do the gripping surfaces. Thus, it will be understood that if a pipe is placed between the jaws of the vise, as has been shown in Fig. 5, and they are adjusted tightly against it, by the tightening of the hand nuts against the outer ends of the jaws, then any turning of the pipe under the influence of the thread cutting dies will cause one of the gripping blocks to be shifted outwardly along its mounting surface 82 or 82' and thus caused to be more tightly wedged against the pipe, and the pipe pressed more firmly against the opposite block and the teeth 80 of the opposite jaw.

The use of the gripping blocks 85 and 86, mounted in the manner shown in Fig. 5, provides that the pipe will be held against rotation in either direction. Therefore, after a thread has been cut on a pipe by the turning of the dies in one direction, the motor can be reversed to unthread the dies from the pipe and the pipe will be held against turning with the dies.

One of the features of this threader resides in the fact that if the vise is shifted to its outer limit, to receive the pipe that is to be threaded, and the jaws thereof are then tightened against the pipe to secure it, after the inner end of the pipe has then properly engaged with the dies, the turning of the dies in the thread forming operation will operate to advance the pipe automatically, and the vise will move inwardly in accordance with the formation of the threads.

In the present instance the circuit for the electric motor which drives the disk 22 on which the threading dies are mounted, includes a limit switch 95. This is shown in Fig. 6 to be of push button type and fixedly mounted in the bracket portion 12 of the main frame. The push button of this switch is disposed in the path of a push rod 96 that is slidably contained in a post 97 that is fixed to the bracket to extend along the adjacent rod bearing 56, as seen in Fig. 2. At its outer end the rod is equipped with a cap 98 and a coiled spring 99 is confined under compression between the cap and post to normally hold the push rod retracted from the switch button.

The cap 98 is disposed in such position that when the vise has been shifted inwardly by the thread forming operation to near its limit of travel, it finally engages against an edge of the cap 98 and through it, pushes the rod 96 inwardly, to open the limit switch and thus open the circuit to the motor and stop the threading operation. The motor circuit, and its controls have been shown in Fig. 9 wherein 100 and 101 designate the supply lines from a source of electric current. These lines lead to a reversing switch mechanism indicated at 102. From the switch 102 feed lines 103 and 104 lead to the electric motor 11. The limit switch 95 is interposed in the circuit line 101. The circuit is controlled by main switch M.

It is shown in Figs. 3 and 6, that the cap 98 on the end of push rod 96 is formed at its top side with a longitudinal channel 105, and a spring metal strip 106 is fixed at one end to the post 97 to extend therealong and to yieldingly seat at its free end in this channel, to hold the cap against rotation. The cap is also shown to be generally circular in cross-sectional form, but formed with a recess at one side, as at 107. By unseating the spring strip from the channel 105, the cap 98 can be rotated to a position at which the recessed side will clear the vise and thus permit the cap to be shifted outwardly under the pressure of spring 99 and the switch 95 to be closed to re-establish the motor circuit through line 101.

Assuming the various parts of the threader to be constructed, and assembled as described, and the dies 26 applied to the holders, the device is used as follows:

First, the vise is opened so that the pipe end that is to be threaded can be passed between the vise jaws and through the guide sleeve 40 and engaged properly with the thread cutting dies. Then the vise is shifted to its outward limit, and the jaws 65—66 adjusted against the pipe to assume the holding relationship thereto as shown in Fig. 5. In this position of the vise, the push rod 96, is disengaged from the switch button of switch 95. With the reversing switch properly set, the closing of the main switch sets the motor in operation to drive the worm shaft 28 and turn the thread cutting dies in proper direction for thread cutting. As the dies advance along the pipe end, the pipe will be pulled inwardly, shifting the vise accordingly and finally causing it to engage the cap 98 of the push rod to move the rod inwardly to open limit switch 95 and motor circuit, thus to stop the threading operation.

At any time before the limit switch is engaged, the operator can reverse the position of switch 102 thus to cause the reversal of the threader. In this way the length of the thread on the pipe end can be controlled; it not being necessary that the thread be formed to maximum length.

In the event that the threading operation is allowed to continue until the limit switch 95 has been engaged and opened, and the threading operation thus stopped, then the operator reverses the position of switch 102 and this is followed by a rotative movement of the cap 98, whereby it is disengaged from contact with the vise and the push rod 96 is allowed to be pushed outwardly by spring 99, thus to allow switch 95 to close and re-establish the motor circuit, and cause the motor to drive the worm shaft in the other direction thus to unthread the dies for the pipe.

The present device is relatively simple in its construction and mode of use. It can be disposed for use on a bench or table or placed on a floor and it is not essential that it be anchored in place. The legs that are applied thereto serve to hold it in the most convenient position for use, and if desired they can be used as anchoring means.

The details of construction of the vise jaws and the gripping blocks insure holding the pipe against turning in either direction, and provide for an increased gripping effect with any turning movement of the pipe. The limit switch used in connection with the movable vise provides for automatic stopping of the threading operation as a safety measure.

Having thus described my invention, what I claim as new therein, and desire to secure by Letters Patent, is:

1. A pipe holding vise comprising a frame structure, a pair of opposedly related jaw plates mounted in the frame structure for relative clamping and releasing adjustment toward and from each other, means for effecting and retaining adjustments of the said jaw plates; one of said plates having a V-shaped recess in its end surface, a pair of pipe gripping blocks slidably mounted, respectively, on the diverging surfaces of the said recess and having friction surfaces designed to cooperatively seat a pipe thereagainst, and adapted for limited and independent sliding movement along said diverging surfaces under the influence of axial turning of a pipe clamped thereagainst; the other of said jaw plates having a clamping end portion thereof extended directly toward the base of the recess of the first mentioned jaw plate and adapted to be holdingly clamped against the pipe to retain it firmly seated against both of said blocks; each pipe gripping block being wedge shaped, tapering from its inner to its outer end and providing that any outward movement thereof along the supporting surface of the V-shaped recess under rotative movement of a gripped pipe causes it to decrease the distance of its gripping surface from the clamping end portion of the second jaw plate and increase its clamping action.

2. A vise as in claim 1 wherein the said gripping blocks are slidably secured on the diverging surfaces of the V-shaped recess and springs operate thereagainst to urge them toward the base of the recess.

References Cited in the file of this patent

UNITED STATES PATENTS

| | | |
|---|---|---|
| 272,193 | Beard | Feb. 13, 1883 |
| 810,304 | Remion | Jan. 16, 1906 |
| 1,017,878 | Landis | Feb. 20, 1912 |
| 1,174,167 | King | Mar. 7, 1916 |
| 1,465,488 | Schmelz | Aug. 21, 1923 |
| 1,616,284 | Sosdian | Feb. 1, 1927 |
| 1,705,240 | Devine | Mar. 12, 1929 |
| 2,215,270 | Mathias | Sept. 17, 1940 |
| 2,219,944 | Schoepe | Oct. 29, 1940 |
| 2,289,850 | Matter | July 14, 1942 |
| 2,304,027 | Sellmeyer | Dec. 1, 1942 |